(No Model.)

H. LOWE.
MUZZLE FOR HORSES.

No. 432,317. Patented July 15, 1890.

Witnesses:
Edw H Deavitt
George W Bolton

Inventor:
Harry Lowe
By J. J. Deavitt
his Attorney

UNITED STATES PATENT OFFICE.

HARRY LOWE, OF MONTPELIER, VERMONT.

MUZZLE FOR HORSES.

SPECIFICATION forming part of Letters Patent No. 432,317, dated July 15, 1890.

Application filed October 31, 1889. Serial No. 328,871. (No model.)

*To all whom it may concern:*

Be it known that I, HARRY LOWE, a citizen of the United States, residing at Montpelier, in the county of Washington and State of Vermont, have invented a new and useful Muzzle for a Horse, of which the following is a specification.

My invention relates to improvements in a muzzle for a horse which allows a horse to eat and drink, and may be quickly converted into a close muzzle.

The objects of my improvements are, first, to provide a muzzle for a horse made in sectional parts, so constructed that it may be quickly converted from a close to an open muzzle, or vice versa, without the use of tools or buckles or removing the muzzle from the horse's head; second, to provide a muzzle for a horse of such form or shape to allow procuring food and drink through the smallest opening possible without chafing the lips or jaws when the lower central portion is removed; third, to provide a muzzle for a horse of such form or shape to allow procuring food and drink, yet preventing eating food too rapidly and all vicious habits—such as tearing his blankets or other wearing-apparel, biting himself or attendants, gnawing the manger or stall, cribbing, &c.—when the lower central portion is removed, and, fourth, to provide a muzzle for a horse that will prevent procuring food when the lower central portion is replaced. I attain these objects by the device illustrated in the accompanying drawings, in which—

Figure 1:
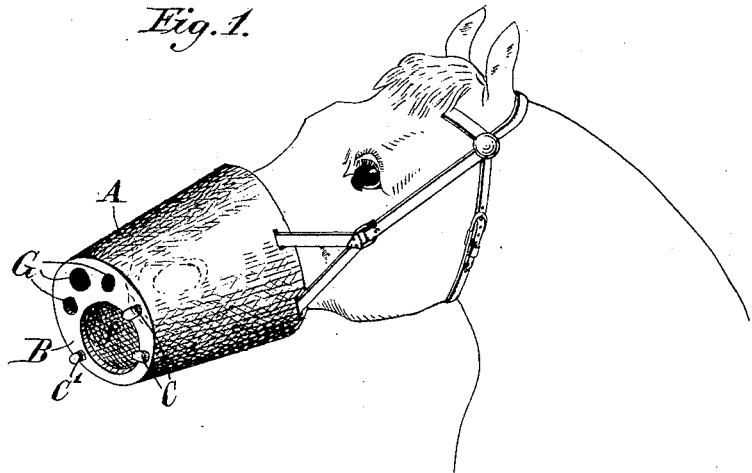
Figure 2:
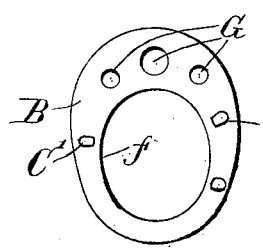
Figure 3:
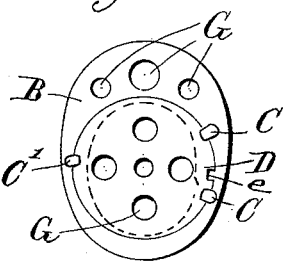
Figure 4:
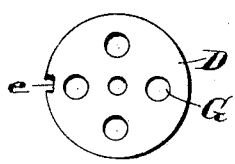
Figure 5:
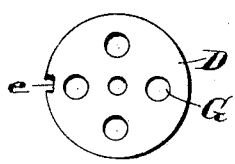

Figure 1 is a side view of a muzzle in position on a horse's head, showing the body portion with the flange or sectional part of the bottom attached. Fig. 2 is a view of the flange or sectional part of the bottom as it appears with the lower central portion removed, showing the shape and position of the opening through which food and drink are procured. Fig. 3 is a view of the bottom as it appears with the lower central portion attached, showing the position of the studs or bosses made to receive and hold the lower central portion. Fig. 4 is a vertical view of the stud or boss, showing the groove or recess to receive the edge of the lower central portion. Fig. 5 is a view of the lower central portion of the bottom, showing a notch cut from the edge to receive one of the studs when placing in position.

Similar letters refer to similar parts throughout the several views.

A is the body portion of a muzzle, to which the flange B is rigidly attached. Studs C are a part of or rigidly attached to flange B, as shown in Figs. 2 and 3, and are grooved at $h$, Fig. 4, to receive the edge of the lower central portion or removable bottom piece D. The inner edge or rim of flange B is shown at $f$. The lower central portion or removable bottom piece D, Fig. 5, is made round, with a notch $e$ in the edge sufficiently wide to receive stud C′, Fig. 3, which is narrower than the other studs to prevent the removal of the portion D except at this point, being held in position by turning notch $e$ to the opposite side of stud C′, also that the removable bottom piece D can be quickly attached to and detached from the flange B without removing the muzzle from the horse's head. Portions B and D are provided with spaces G to admit sufficient air for ventilation when in use.

It will be seen from the forgoing description of my improved muzzle for a horse that this peculiar form of opening admits procuring food and drink without chafing the jaws or lips, and through so small space as to prevent all vicious use of the teeth, the opening being of similar shape to the horse's muzzle or snout.

When the lower central portion D is removed to allow procuring food without chafing the lips, and at the same time prevent the animal from grazing or biting with his teeth, I construct flange B with the greater width at the upper front part and its narrower width at the lower rear part. This construction allows the animal to procure food with the lips, and yet prevents him from grasping any object with his teeth, as the upper jaw comes in contact with the greater width portion of the flange when in the act of biting, which prevents the muzzle slipping up the face and jaws protruding. The narrower width of the flange at its lower rear part allows free use of the lower jaw sidewise in the act of chewing without chafing, close observation of the action of the jaws showing the upper jaw to be stationary and the lower jaw in motion in the act of chewing food.

I am aware that open-bottom muzzles for horses have been used. I therefore do not claim an open bottom in its broad sense. Neither do I claim a muzzle made in two parts; but What I do claim as my invention, and desire to secure by Letters Patent, is—

1. A muzzle for horses, consisting of a body portion and a flange projecting inwardly from the bottom edge thereof and at substantially a right angle thereto, the upper part of said flange or that part which is opposite the upper jaw of the animal being of substantially crescent shape and wider than the lower part, the opening surrounded by the flange being located substantially opposite the lips of the animal, all substantially as shown and described.

2. A muzzle for horses, consisting of a body portion having an open bottom and a flange surrounding the opening, grooved studs mounted on said flange, and a removable bottom piece having slotted edges, whereby the grooved pin and the slot operate to form a bayonet-joint for holding the bottom piece in place, all substantially as described and shown.

HARRY LOWE.

Witnesses:
THOMAS J. DEAVITT,
RUFUS R. RIKER.